United States Patent [19]

Alcorn

[11] Patent Number: 4,795,049

[45] Date of Patent: Jan. 3, 1989

[54] SIDE WALL AND TOP RAIL CONSTRUCTION FOR OPEN TOP CONTAINERS

[76] Inventor: John W. Alcorn, 3897 Eunice Rd., Jacksonville, Fla. 32250

[21] Appl. No.: 56,384

[22] Filed: May 29, 1987

[51] Int. Cl.4 ............................................. B62D 33/00
[52] U.S. Cl. ........................................ 220/71; 220/1.5
[58] Field of Search ..................... 220/71, 72, 83, 84, 220/76, 7, 8, 1.5; 52/398, 399, 401, 573

[56] References Cited

U.S. PATENT DOCUMENTS

| | | | |
|---|---|---|---|
| 3,073,466 | 1/1963 | Greer et al. | 220/1.5 X |
| 3,306,487 | 2/1967 | Gregoire | 220/1.5 |
| 3,310,925 | 3/1967 | Le Brun | 52/573 |
| 3,830,381 | 8/1974 | Bodenheimer et al. | 220/8 X |
| 3,834,575 | 9/1974 | Carr | 220/1.5 |

Primary Examiner—Steven M. Pollard
Attorney, Agent, or Firm—Arthur G. Yeager

[57] ABSTRACT

An open top container having at least one side wall constructed of vertically disposed panels having horizontally extending corrugations or ribs lending beam and column strength to the side wall panels. The panels of that side wall can have an interconnecting slip joint permitting limited horizontal movement between the panels. The top rail of at least that side wall can have inner and outer sleeved sections permitting limited longitudinal movement of the top rail to relieve the unit compressive forces on the top rail imposed by a load in the container. Preferably the slip joint is generally midway of the side wall and closely adjacent the top rail sleeved sections. Also, both side walls of a rectangular container for maximum advantage should include the horizontal corrugations, and slip joint and the top rail sleeved sections.

8 Claims, 4 Drawing Sheets

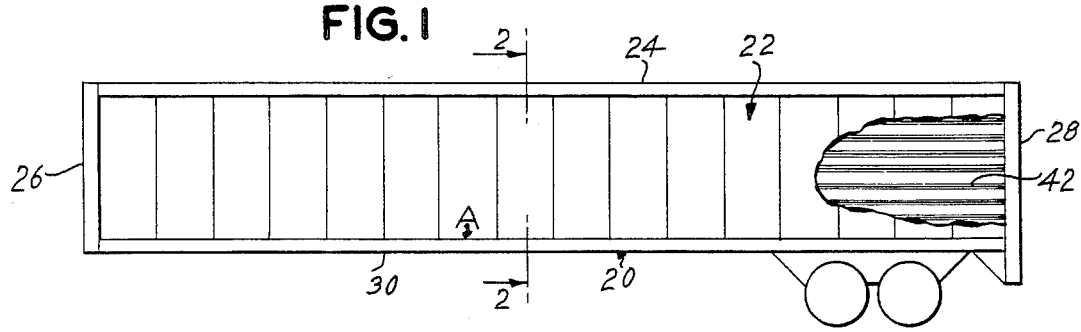
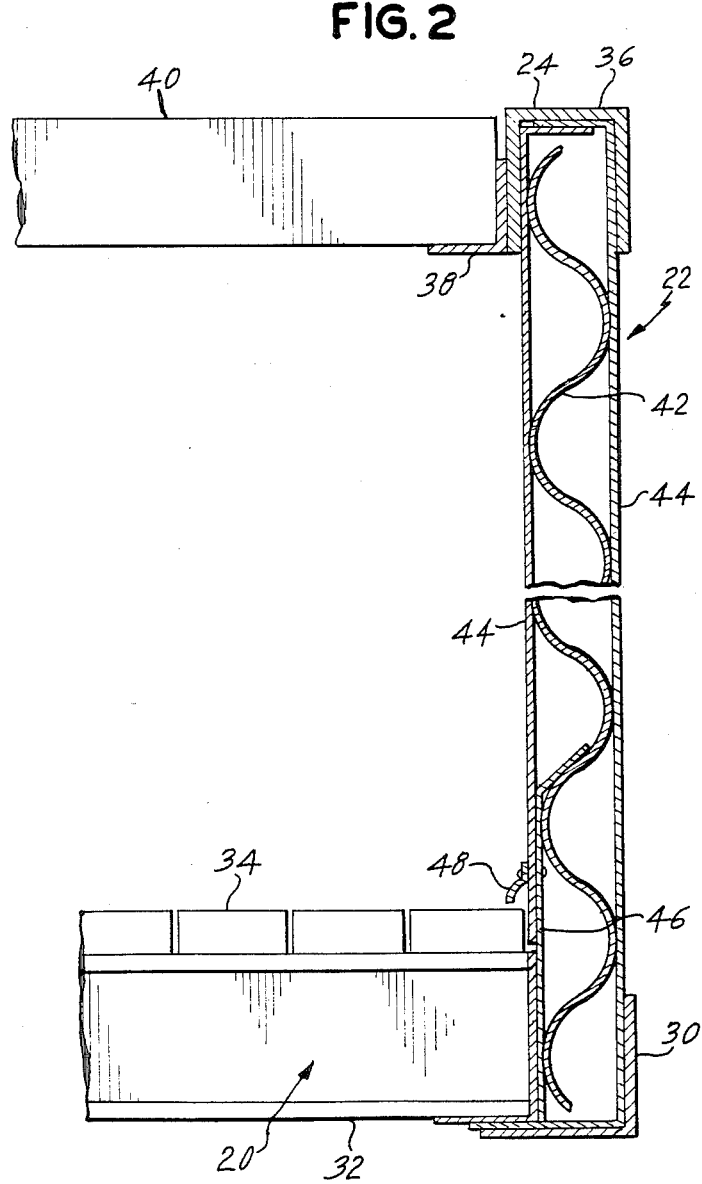
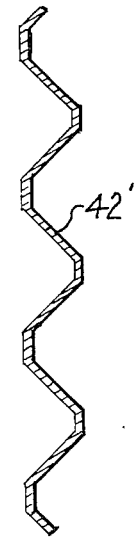
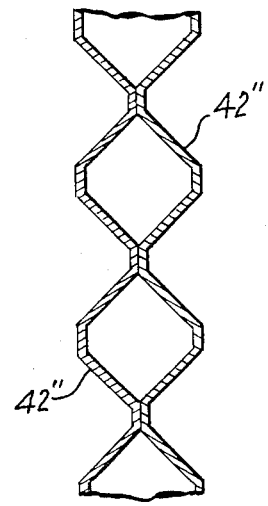

FIG. 5
FIG. 6
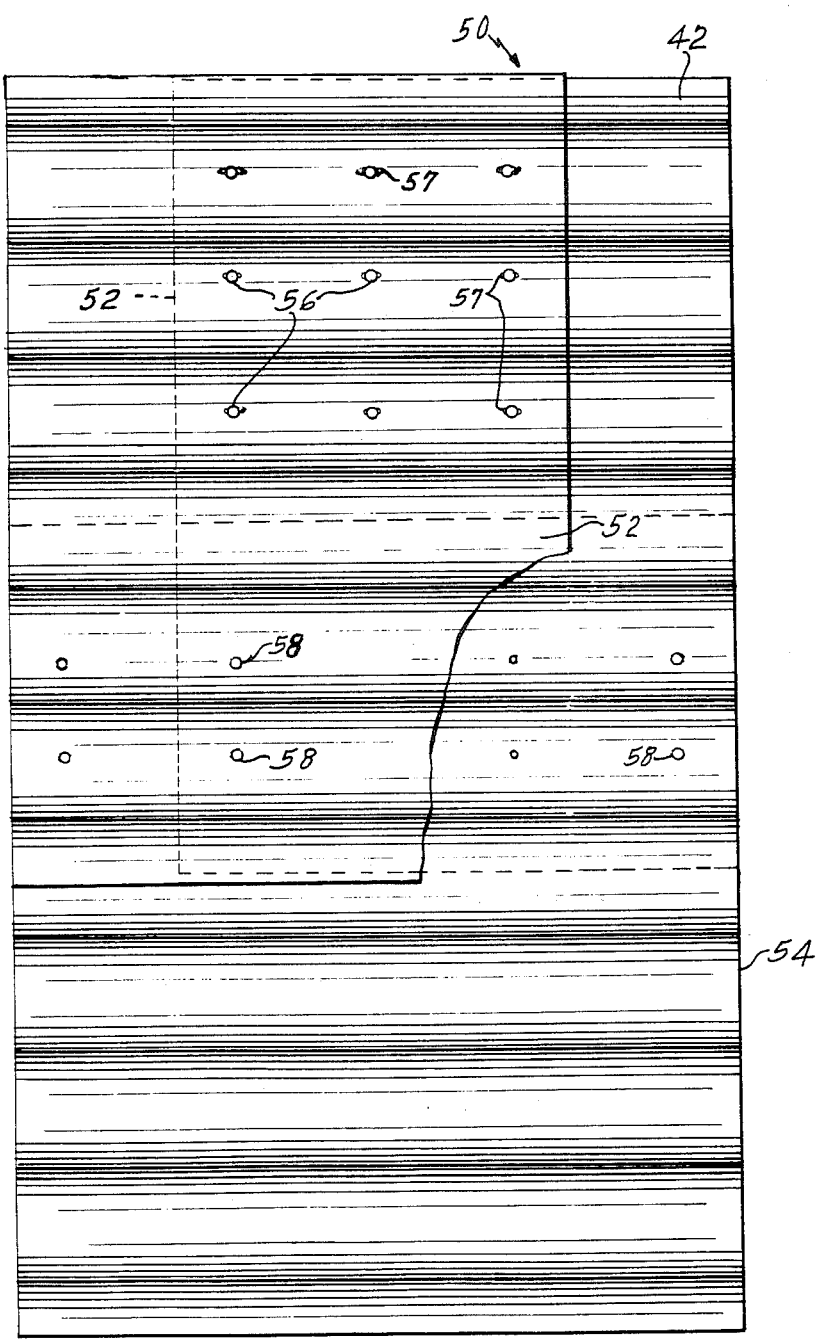
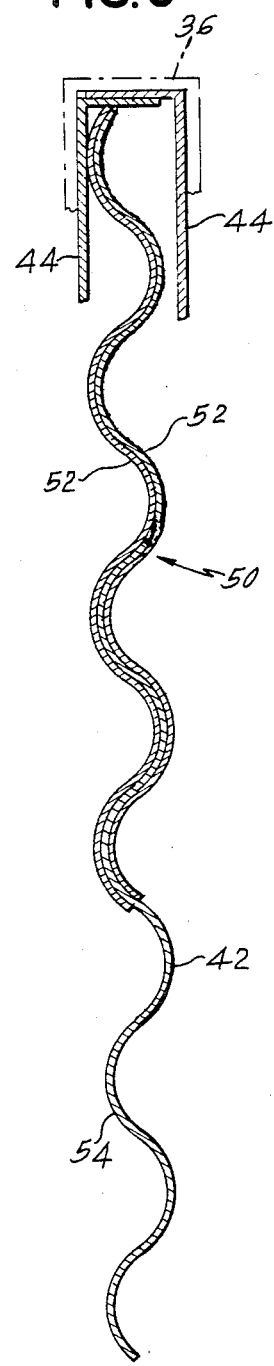

SIDE WALL AND TOP RAIL CONSTRUCTION FOR OPEN TOP CONTAINERS

BACKGROUND OF THE INVENTION

1. Field of the Invention

This invention relates to the side wall and top rail construction of open top containers for moving, transporting or storing materials.

2. Summary of the Prior Art

Open top containers for moving or storing materials generally have a bottom, side walls and end walls. The container is basically open at the top but may have a removable covering or have a non-rigid closed top. Examples of such containers are truck trailers, rail cars or scrap gondolas and are illustrated in U.S. Pat. No. Des. 238,259 and U.S. Pat. No. 4,252,067.

The conventional configuration of the side wall of these containers is a bottom rail attached to a rectangular horizontal floor and supporting vertical studs or side posts which carry a top rail. Cover sheets of material are fastened to the bottom rail, vertical studs and top rail to form the container. The bottom rail and top rail are designed to carry the load of the material in the container and the vertical studs and cover sheets contain the load.

In both open top and closed top containers the bottom rail is in tension. In open top containers, however, the top rail is in compression and must, therefore, be designed as a column also to carry the load within the container. As loads are increased, the compressive force is increased tending to buckle or bow the top rails outwardly or inwardly which may require the top rail size to be increased or may require the use of cross ties or trusses between the side walls. Such cross ties may be undesirable for freely loading and unloading the container and are subject to damage or removal by the container user. Thus, conventional container designs have relied on the top rail to carry the downward forces of the load as a beam and on cross ties to offset the compressive buckling of the top rail.

SUMMARY OF THE INVENTION

It is an object of this invention to provide an improved side wall construction for use in open top containers, the side walls having horizontal corrugations or ribs to carry the downward and buckling forces imposed on the container by the load of the material within the container. The corrugations or ribs improve the moment of inertia of the side walls to resist the forces of the load on the side wall and to accept portions of the compressive buckling forces on the container top rail.

It is also an object of this invention to provide an interconnection between vertically adjacent side wall panels which permits limited movement between the panels to relieve the unit compressive or buckling forces imposed by the load on the upper sections of the side walls.

It is a further object of this invention to provide a slip joint interconnection between vertically adjacent overlapping container side wall panels, the interconnection being located generally midway of the container length to maximize side wall strength in the area of greatest bending moments imposed by the load in the container.

It is a still further object of this invention to provide an improved container side post configuration integral with a horizontally corrugated or ribbed side wall.

It is also an object of this invention to provide a container top rail which relieves the unit compressive or buckling forces imposed by the load on the top rail.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

BRIEF DESCRIPTION OF THE DRAWINGS

FIG. 1 is an illustration of a trailer type open top container in which this invention can be utilized, portions being broken away to illustrate the improved generally horizontal corrugated side wall construction in accord with this invention;

FIG. 2 is an enlarged sectional view taken along the line 2—2 of FIG. 1;

FIGS. 3 and 4 are illustrations of alternate forms of the side wall construction;

FIG. 5 is an elevational view of the interconnection overlap permitting limited movement between the vertically adjacent side wall panels;

FIG. 6 is a sectional view illustrating the overlap shown in FIG. 5;

DESCRIPTION OF THE PREFERRED EMBODIMENTS

Figure 7:
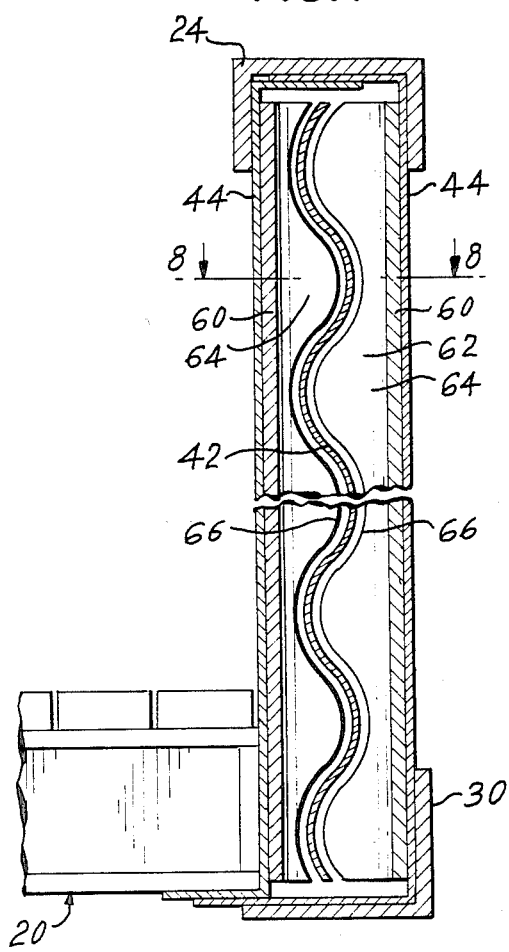
FIG. 7 is a sectional view illustrating the improved side post integral with the improved side wall panel.

Attention is now directed to FIG. 1 which illustrates an open top truck trailer in which the invention herein can be readily utilized. It should be noted, however, that this invention can be adapted to other types of containers such as rail cars, scrap gondolas, those containers used for containerized freight, and closed top containers.

These containers typically have a bottom or floor 20, side walls 22 extending between a top rail 24 and the floor 20 and front and rear walls 26, 28, respectively.

The floor assembly 20 can be of any typical construction and comprised of opposed rails 30 running lengthwise of the container. The rails 30 support floor beams 32 upon which longitudinally extending floor boards 34 are supported. The top rail 24 can be a channel 36 supporting a flange 38 upon which cross-ties or trusses 40 are mounted. The cross-ties or trusses 40 may be used depending upon the load requirements of the container.

The improved side walls 22, in accordance with this invention, comprise corrugated or ribbed panels 42 which provide beam and column strength to the side walls to resist the force of the load on the floor. In FIG. 1 the corrugations take a smooth wave form; however, the ribs in the panels can take a somewhat truncated triangular form as shown at 42' in FIG. 3. Further, the panels can be opposed as illustrated at 42" in FIG. 4 to add additional strength and/or improved moment of inertia to the side walls.

The panels 42 can be sandwiched between the interior and exterior sheet material 44. The bottom rail 46 can also be positioned between the rail 30 and the panel 42 and a molding 48 positioned to trim out the floor and side panel.

It can be seen from the container thus far described that as the load places forces on the container in downward direction, shown by arrow A of FIG. 1, the upper portion of the side panels and top rail are placed under compression and with the corrugated or ribbed construction of the side panel, the side panels are thus improved to resist the compressive forces of the load reducing the required size of the top rail and reducing or eliminating the cross-ties or trusses. Depending on design specifications the top rail may be practically eliminated.

Reference is now made to FIGS. 5 and 6 which illustrate the slip joint 50, according to another aspect of the invention, which aids in reducing the unit compressive forces on the side wall by allowing the total compressive force to be distributed to a larger area. The joint 50 may comprise a partially overlapped pair of upper panels 52 which partially overlap a single lower panel 54. Fasteners 56 carried in oversized holes 57, preferably oversized in the horizontal direction only, will secure the upper panels 52 together in a pre-set tight but loose fashion and permit limited sliding movement between the panels 52 to distribute the compressive forces on the panels imposed by the load. The panels 52 are secured to panel 54 by tightly fitting fasteners 58 which inhibit any relative movement therebetween. This joint construction permits movement between the panels in a horizontal direction but not in a vertical direction due to the interlocked ribs or corrugations of the panels and not in a perpendicular direction due to fasteners 56 which have the pre-set tightness locked in place. The overlapping slip joint or joints 50 may be placed at various locations along the length of the panels but one is preferably located at or adjacent the longitudinal center of each of the sides to provide the additional metal in the area of the side wall receiving the greatest bending moment from the weight of the load. Also, locating the slip joint 50 near the top of the panel adjacent the top rail will add additional metal in the upper area of the side wall which is under the greatest moment and compression from the weight of the load in the container and which most effectively will be relieved thereby. Of course, the top rail 36 used with such a slip joint would be attached to the panels 52 to permit the relieving motion in a direction parallel to the horizontal corrugations.

Figure 8:
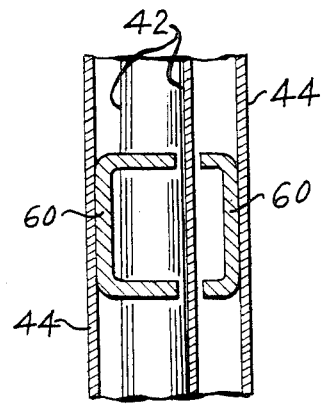
FIG. 8 is a sectional view taken along the line 8—8 of FIG. 7.

Referring now to FIGS. 7 through 10, various forms of a side post 60, 60' are shown which can be used with the novel side panels. In FIGS. 7 and 8 the post 60 takes the form of a column 62 having sides 64 with opposed faces 66 following the contour of the surface of the corrugated panel 42. In this fashion the side post provides the desired moment of inertia and strength as well as provides a smooth surface for reducing wind drag and maximizing the interior container size by minimizing the overall wall thickness.

Figure 9:
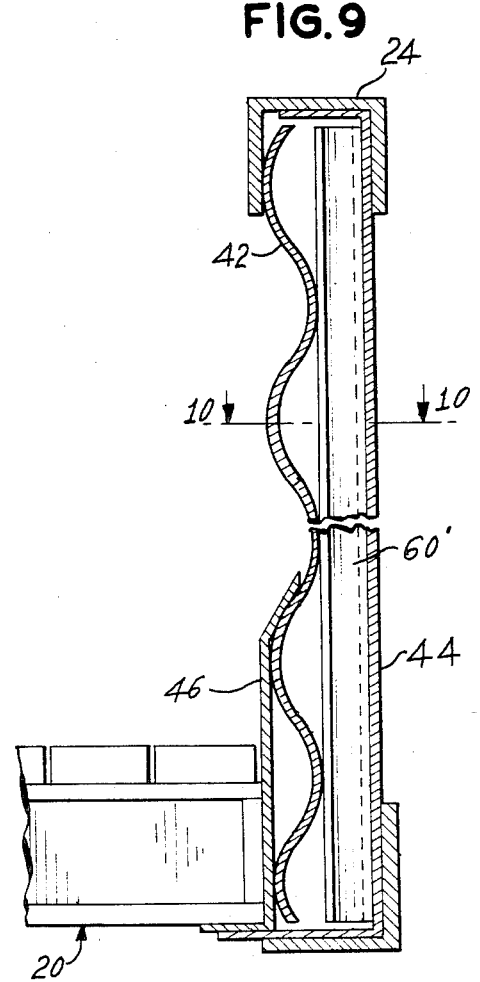
FIG. 9 is an illustration of an alternate side post construction.
Figure 10:
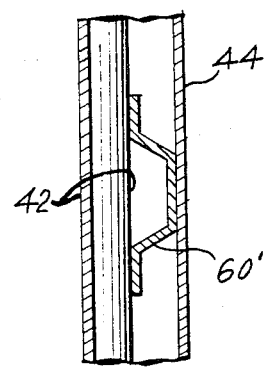
FIG. 10 is a sectional view taken along the line 10—10 of FIG. 9.
Figure 11:
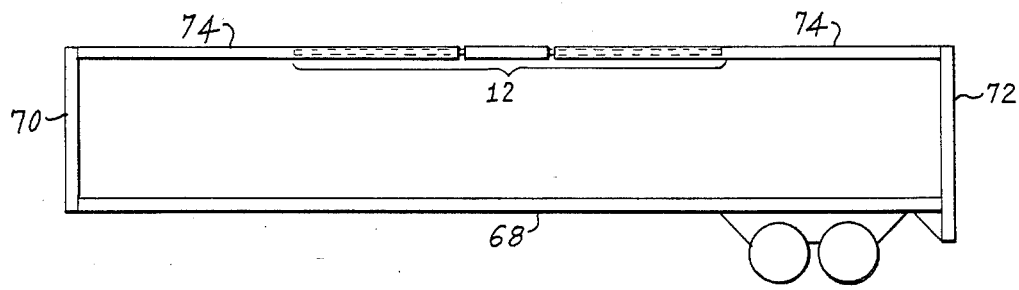
FIG. 11 depicts a trailer type open top container having a generally horizontal corrugated side wall construction and an improved top rail construction according to this invention.
Figure 12:
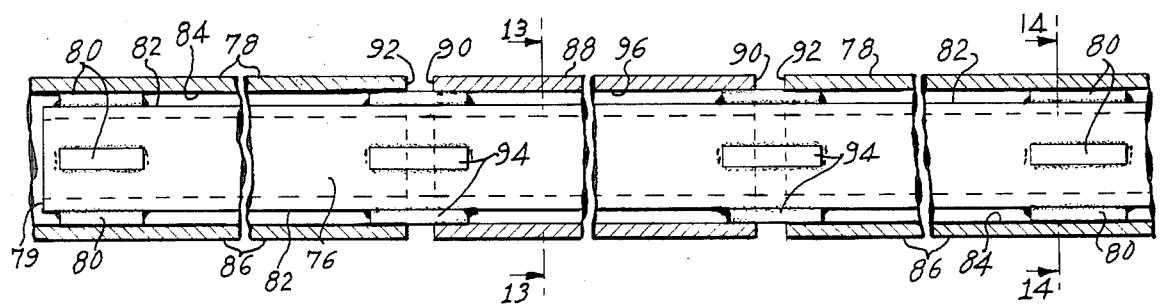
FIG. 12 is an enlarged view of the area 12 of FIG. 11 and illustrating the details of the improved top rail.
Figure 13:
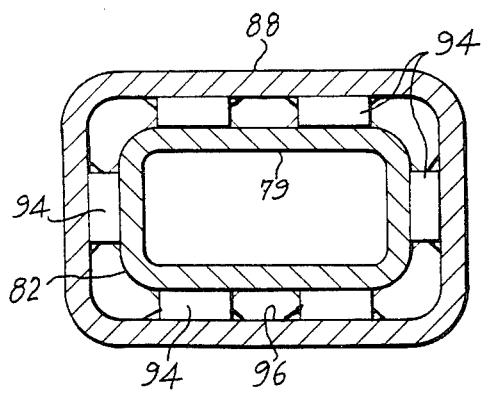
FIG. 13 is an enlarged sectional view taken along the line 13—13 of FIG. 12.
Figure 14:
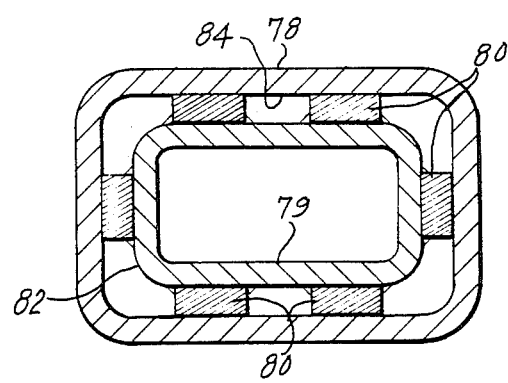
FIG. 14 is an enlarged sectional view taken along the line 14—14 of FIG. 12.

FIGS. 9 and 10 illustrate a side post 60' positioned between the panel 42 and the sheet material 44. This side post can be a channel, rectangular tube, solid or the shape illustrated and may be used on one or both sides of the panel depending on the load requirements of the container.

Reference is now made to FIGS. 11 through 14 which illustrate an improved top rail 74, according to a further aspect of the invention, which can be utilized to relieve the compressive forces of the load on the top rail. The container has a bottom rail 68, end walls 70, 72 and a top rail 74. The top rail 74 has inner and outer telescoping sections 76 and 78 respectively which permit limited movement of the top rail to relieve the compressive forces. The inner section 76 comprises an elongated rectangular tube 79 (see FIG. 14) having spaced shim bearings 80 affixed outwardly of and to the tube outer surface 82 and slidingly fitting within the inner surface 84 of the outer section 78.

The outer section 78 comprises opposed rectangular end tubes 86 receiving the inner section 76. Positioned between the outer end tubes 86 is a sleeve 88, preferably conforming in size and shape to outer section end tubes 86 but affixed to inner telescoping section 76, having end portions 90 spaced from the respective ends 92 of the outer end tubes 86. Shim bearings 94((see FIG. 13) are carried by the inner surface 96 of the sleeve 88, and affixed to ends 90 of sleeve 88 and to the outer surface 82 of tube 79 to permit limited movement between sections 76 and 78 while providing the necessary beam and column strength to the top rail. It should also be noted that an interconnection between the side panels and the top rail can be in a manner permitting the telescoping movement of the top rail. For example, the side panels can be attached to the top rail through fasteners in oversized openings in the panels. It can thus be seen that with the top rail thus described, a portion of the compressive or buckling forces on the top rail can be transferred to the improved side wall construction reducing or eliminating the need for cross-ties.

It should also be noted that the herein disclosed novel side wall and top rail constructions could be utilized to repair existing containers. For example, the corrugated side wall could be placed inside existing conventional side walls or could be used to replace one or more damaged side walls of existing containers. This may possibly reduce or eliminate the need for heavy top rails or cross trusses in conventional containers or may eliminate the need to replace a previously broken or damaged top rail. Also, existing containers could be fitted with the novel telescoping top rail of this invention to relieve the compressive forces on the conventional top rail.

While the invention has been described with respect to certain specific embodiments, it will be appreciated that many modifications and changes may be made by those skilled in the art without departing from the spirit of the invention. All structural parts of the invention can be employed on the side walls of a given container or may be separately used as described with the attendant advantages of each or may be utilized in part dependent on the advantages desired. It is intended, therefore, by the appended claims to cover all such modifications and changes as fall within the true spirit and scope of the invention.

What is claimed as new and what it is desired to secure by Letters Patent of the United States is:

1. An improved side wall construction for use in an open top container wherein side walls of said container comprises vertical panels having horizontally disposed means resisting compressive forces placed on said side walls by a load within said container, said horizontally disposed means in said panels being formed by a plurality of generally longitudinally extending corrugated ribs in said panels to provide beam and column strength, the lower portion of said corrugated panel of each said side wall being a single panel member, the upper portion of each said side wall being vertically spaced separate panel members with a slip joint attachment therebetween permitting limited horizontal movement between said panel members to relieve the unit compressive and buckling forces imposed by the load on the upper portion of each said side wall, said slip joint attachment including a plurality of spaced fasteners carried in respective oversized openings in in said upper panel members to permit said upper panel members to be attached to each other and another plurality of fasteners carried in proper sized openings attaching said upper panel members to said lower panel member and allow limited horizontal movement between said upper panel members to relieve unit compressive forces of a load on said panel members, said side wall construction being operable to resist the outward forces of the load on each said side wall without the use of side posts and to relieve portions of the compressive buckling forces on a top rail of said container to distribute the compressive and buckling forces to larger cross-sectional areas of the corruaged vertical panel members.

2. In the side wall construction of claim 1 further including spaced vertical side posts adjacent said panel members, said side posts having surface configurations facing and following the contour of the corrugated ribs of said panel members.

3. In the side wall construction of claim 1 further including a top rail having means permitting limited longitudinal movement within said top rail to relieve unit compressive forces on said top rail by a load within said container by transferring increased portions of the compressive forces to said longitudinally extending corrugated panels, thus reducing the magnitude of the buckling forces on said top rail.

4. In the side wall construction of claim 3 wherein said slip joint is located adjacent said top rail.

5. In the side wall construction of claim 3 wherein said means permitting limited longitudinal movement includes inner and outer sleeved sections providing vertical strength to said top rail while permitting limited movement between said sections.

6. In the side wall construction of claim 5 wherein said top rail includes shim bearings positioned between said sleeved sections.

7. In the side wall construction of claim 6 wherein said telescoping sections include a central outer section carrying an elongated central inner section with its free end portions slidingly supported within adjacent outer sections and with the ends of the central outer section being spaced from respective ends of said adjacent sections.

8. In the side wall construction of claim 1 wherein said slip joint is located generally centrally of the longitudinal extent thereof.

* * * * *